3,576,871
X-RAY CONTRAST AGENTS
Jaromir Hebky, Vaclav Jelinek, and Bohumil First, Prague, Czechoslovakia, assignors to Spofa United Pharmaceutical Works, Prague, Czechoslovakia
No Drawing. Continuation of abandoned application Ser. No. 605,561, Dec. 29, 1966. This application Nov. 3, 1969, Ser. No. 871,579
Claims priority, application Czechoslovakia, Dec. 30, 1965, 7,869
Int. Cl. C07c 103/33
U.S. Cl. 260—562                    1 Claim

ABSTRACT OF THE DISCLOSURE

An X-ray contrast agent of the formula

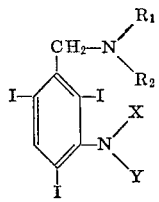

wherein $R_1$ and $R_2$ are —$CH_2CH_2OH$, X is acetyl, and Y is alkyl or hydroxy-substituted alkyl, alkyl having from one to 3 carbon atoms and the hydroxyl substitution being formed by from 1 to 2 hydroxyl groups.

---

This application is a continuation of Ser. No. 605,561, filed Dec. 29, 1966, now abandoned.

The invention relates to new X-ray contrast agents of the Formula I:

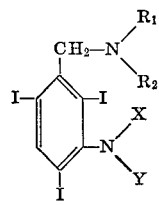

wherein the substituents $R_1$ and $R_2$, identical or different, stand for hydrogen, branched or straight alkyl, contingently substituted with a single or several hydroxy groups, aralkyl-, cycloalkyl-, or hydroxyalkyl groups, whereat said substituents connected together can form a saturated or unsaturated ring, which may comprise a further heteroatom, especially oxygen or nitrogen, X stands for an acyl residue or substituted acyl residue with at most 10 carbon atoms, Y stands for an alkyl or substituted alkyl, especially a hydroxy- or polyhydroxy alkyl with at most 8 carbon atoms, and to salts thereof with non-toxic organic or inorganic acids, so as to the method of preparing same.

Compounds of the above-cited formula are resorbed extraordinarily quickly from the digestive tract on oral application to experimental animals, and are secreted, partly into gall, partly by means of kidney into urine, thus making possible X-ray picturing of the gall bladder and of the urinary bladder, or even picturing of the pelvis renalis, on compressing the urinary tract.

The merit of the new X-ray contrast agents according to the invention, lies above all in the fact the on a single dose thereof cholecystography and urography can be carried out at the same time. The agents are applied either in the form of bases, or of salts with non-toxic organic or inorganic acids. In oral administration the toxicity thereof is very low.

According to the invention, the agents of the Formula I are prepared in the way that compounds of the Formula II:

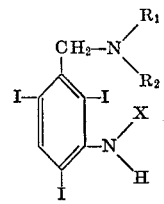

wherein the substituents $R_1$, $R_2$, and X have the same significance as in the Formula I, are brought into reaction with alkyl-, hydroxyalkyl-, or polyhydroxyalkyl esters of organic or inorganic acids, especially with alkyl-, hydroxyalkyl-, or polyhydroxyalkyl halides, -sulfates, or -p-toluenesulfo esters, or with alkylene oxides.

The reaction can be carried out in the presence of inorganic or organic basically reacting compounds, especially alkyali metal hydroxides or carbonates, in the medium of organic solvents, at temperatures from 10° C. up to the temperature of the reaction mixture boiling point.

EXAMPLES (1) 31.5 g. (0.05 mole) of N-(2,4,6-triiodo-3-acetylaminobenzyl)-diethanol amine, 21 g. methyl iodide, 2.0 g. pulverous sodium hydroxide, and 250 ml. dioxane are stirred for 3 hours at a room temperature. The reaction mixture is then filtered, the filter residue washed with further 200 ml. dioxane, and the united filtrates are evaporated in vacuo to dryness, at a bath temperature of 40° C. The evaporation residue is dissolved in 100 ml. absolute ethanol and 110 ml. of ether containing 0.05 mole hydrogen chloride are added. The hydrochloride eliminated is sucked off, and recrystallized from an ethanol-ether mixture. The yield of the pure hydrochloride of N-[2,4,6-triiodo-3-(N' - acetyl - N' - methyl)aminobenzyl]-diethanol amine is 14.3 g. (42%), M.P. 193–196° (decomp.).

(2) 22.05 g. (0.035 mole) of N-(2,4,6-triiodo-3-acetylaminobenzyl)-diethanol amine, 150 ml. ethanol, and 56 ml. aqueous 5 N-potassium hydroxide are stirred at room temperature until all is dissolved. Thereupon 10.8 g. ethylenechlorohydrin is added, the mixture stirred for 3 hours, and left to stand overnight. Next day it is neutralized with dilute hydrochloric acid (1:4) under external cooling with ice water, and then evaporated in vacuo to dryness at a bath temperature of 40° C. The evaporation residue is dissolved in the just necessary quantity of absolute ethanol, filtered, acidified with ethanolic hydrogen chloride solution to pH 5, and is vacuum evaporated at 40° C. to dryness. The evaporation residue is recrystallized from 500 ml. absolute ethanol. The yield of the pure hydrochloride of N-[2,4,6-triiodo-3-(N'-acetyl-N'-β-hydroxyethyl-aminobenzyl]-diethanol amine is 14 g. (56.3%), M.P. 192–197° C. (decomp.).

(3) 22.05 g. (0.035 mole) of N-(2,4,6-triiodo-3-acetylaminobenzyl)-diethanol amine, 150 ml. ethanol, and 56 ml. aqueous 5 N-potassium hydroxide solution are stirred at room temperature until all is dissolved. Thereupon 19.4 g. glycerolchlorohydrine-1 is added, and the mixture stirred for 3 hours at room temperature, upon which it is left to stand overnight. Next day the reaction mixture is neutralized with dilute hydrochloric acid (1:4), and vacuum-evaporized to dryness at 40° C. The evaporation residue is dissolved in absolute ethanol, alkalized with ammonia to pH 7.5, and the semisolid base thus obtained is triturated with water until the Cl⁻ ion reaction is disappeared. The base is dissolved in ethanol, and after dehydrating, benzene, is added. The pure base of N-[2,4,6-triiodo-3-(N'-acetyl-N'-β,γ-dihydroxypropyl) aminobenzyl]-diethanol amine constitutes a colourless amorphous and low-melting substance. The yield is 17.0 g. (69%).

We claim:

1. An X-ray contrast agent selected from (A) compounds of the formula

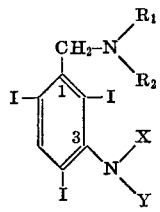

wherein $R_1$ and $R_2$ are each —$CH_2CH_2OH$, X is acetyl and Y is β,γ-dihydroxypropyl, and (B) pharmaceutically acceptable salts thereof.

References Cited

UNITED STATES PATENTS 3,366,625   1/1968   Hebky et al. _____ 260—562
3,178,473   4/1965   Holtermann et al. ____ 260—519

HENRY R. JILES, Primary Examiner

H. I. MOATZ, Assistant Examiner

U.S. Cl. X.R.

424—5